United States Patent
Sertbas et al.

(10) Patent No.: US 12,442,720 B2
(45) Date of Patent: Oct. 14, 2025

(54) METHOD FOR ESTIMATION OF MALFUNCTION USING SOUND

(71) Applicant: BORUSAN MAKINA VE GUC SISTEMLERI SANAYI VE TICARET ANONIM SIRKETI, Istanbul (TR)

(72) Inventors: Salih Sertbas, Kocaeli (TR); Yunus Emre Kurt, Kocaeli (TR)

(73) Assignee: BORUSAN MAKINA VE GUC SISTEMLERI SANAYI VE TICARET ANONIM SIRKETI, Istanbul (TR)

( * ) Notice: Subject to any disclaimer, the term of this patent is extended or adjusted under 35 U.S.C. 154(b) by 380 days.

(21) Appl. No.: 17/606,586

(22) PCT Filed: May 16, 2020

(86) PCT No.: PCT/TR2020/050425
§ 371 (c)(1),
(2) Date: Oct. 26, 2021

(87) PCT Pub. No.: WO2020/236115
PCT Pub. Date: Nov. 26, 2020

(65) Prior Publication Data
US 2022/0228949 A1     Jul. 21, 2022

(30) Foreign Application Priority Data

May 17, 2019   (TR) ................................. 2019/07462

(51) Int. Cl.
*G01M 13/028*   (2019.01)

(52) U.S. Cl.
CPC ................................. *G01M 13/028* (2013.01)

(58) Field of Classification Search
CPC ........................ G05B 23/0227; G01M 13/028
See application file for complete search history.

(56) References Cited

U.S. PATENT DOCUMENTS

| | | |
|---|---|---|
| 6,772,633 B2 | 8/2004 | Terry et al. |
| 9,824,511 B2 | 11/2017 | Valeri et al. |

(Continued)

FOREIGN PATENT DOCUMENTS

CN      102809493 A      12/2012

OTHER PUBLICATIONS

International Search Report, issued in PCT/TR2020/050425, dated Nov. 3, 2020.

(Continued)

*Primary Examiner* — Jennifer Bahls
(74) *Attorney, Agent, or Firm* — Egbert, McDaniel & Swartz, PLLC

(57) ABSTRACT

A malfunction estimation method allows personnel and spare parts to be provided according to the nature of the fault by means of the estimation of malfunction using machine noise analysis. The sounds of the machines are recorded online or offline via a mobile application on the mobile devices of operators or customers. Mentioned sounds and sounds from an audio database are analyzed by fault classification algorithms and the fault information is reported to the operator or customer online or offline via mobile application or an internet platform. It is ensured that the malfunctioned part is detected with only one mobile device without the need for additional equipment.

3 Claims, 1 Drawing Sheet

(56) References Cited

U.S. PATENT DOCUMENTS

| | | | |
|---|---|---|---|
| 2004/0112136 A1* | 6/2004 | Terry | G01M 13/028 |
| | | | 73/572 |
| 2005/0096873 A1 | 5/2005 | Klein | |
| 2005/0131825 A1* | 6/2005 | Vijay | G06F 16/43 |
| | | | 707/E17.032 |
| 2010/0037237 A1* | 2/2010 | Reinart | G06F 9/541 |
| | | | 719/312 |
| 2014/0156032 A1* | 6/2014 | Jenkins | G06F 16/632 |
| | | | 700/78 |
| 2017/0076514 A1 | 3/2017 | Valeri et al. | |
| 2019/0339688 A1* | 11/2019 | Cella | H04L 1/18 |

OTHER PUBLICATIONS

Written Opinion of the International Searching Authority, issued in PCT/TR2020/050425, dated Nov. 3, 2020.

\* cited by examiner

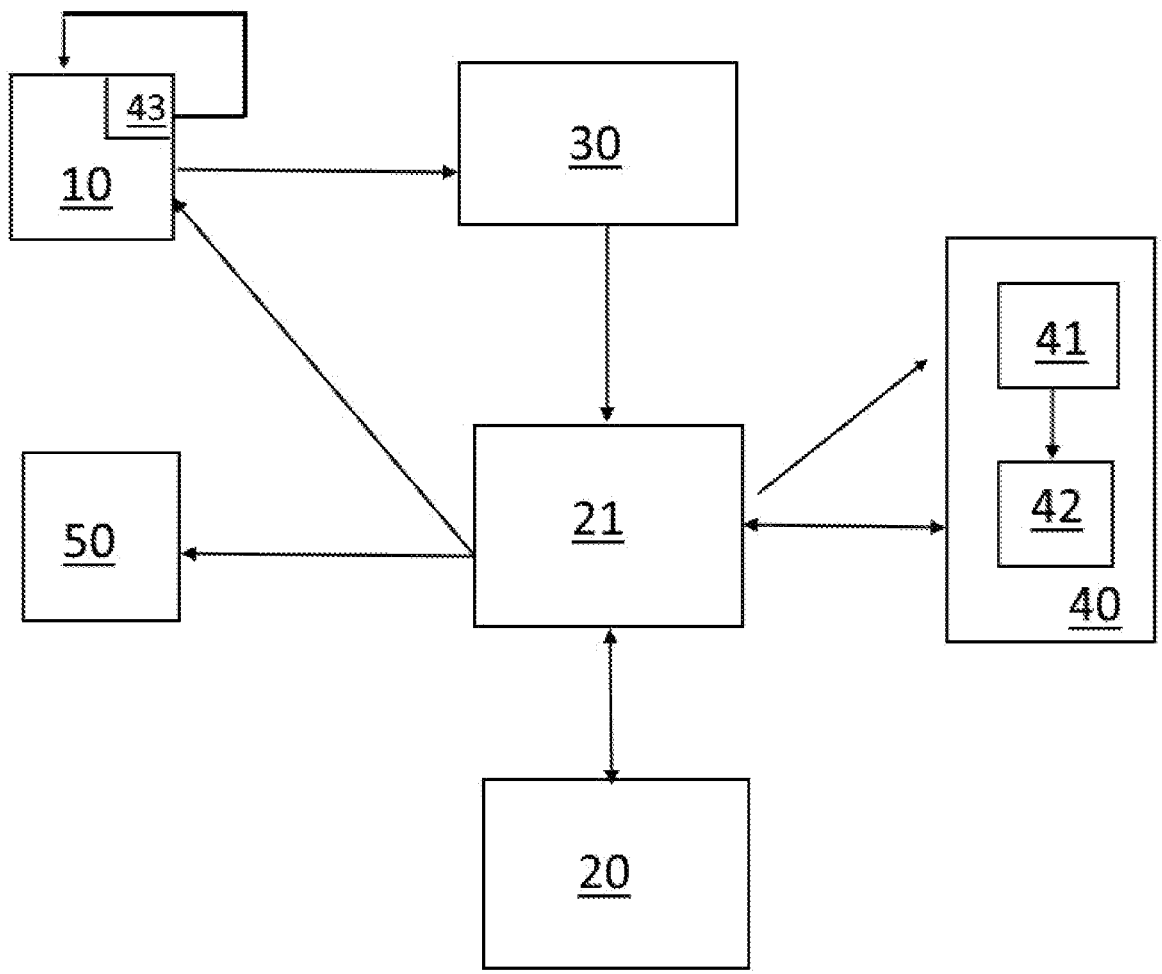

METHOD FOR ESTIMATION OF MALFUNCTION USING SOUND

TECHNICAL FIELD

The invention relates to a method that allows analysis of machine sounds and estimation of malfunction.

More specifically, the invention relates to a method that allows the machine operators or customers to receive the sounds of the machines online or offline through a mobile application on their mobile devices, to analyze the mentioned sounds with artificial intelligence algorithms and to report the fault information to the operator or the customer through the mobile application.

PRIOR ART

With the development of technology, machines are developing day by day and their usage areas are increasing. The machines, which are located in many areas, are taken to the service periodically and thus, the necessary maintenance and controls are performed and the malfunctions are eliminated. The maintenance performed extends the lifetime of the machines as well as eliminating malfunctions and functioning properly.

Ensuring that the machines functioning properly is very important in terms of labor, time and cost. Particularly, when malfunction occurs in the heavy equipment, the repair processes prevent the operation of the machinery, causing the work to be impossible and the work plan to be troubled. In this regard, the rapid detection of faults occurring in the heavy equipment and learning from which component the problem is caused will lead to shorter repair time by directing qualified personnel and spare parts to the faulty machine.

Recently, vibration and frequency analysis of the sound has been used in order to determine which part of the machine the fault is in. The operating sounds of the machines give information about their current status. In the current methods, it can often be determined whether there is a problem by regularly checking the vibration values of the machine sounds with measuring devices. However, current solutions do not allow instantaneous learning of the defective part through an online or offline platform when a problem occurs with the machines. Due to insufficient data related to the malfunction, technicians cannot be assigned to the works to provide optimal efficiency and the estimating of malfunction process is prolonged due to misdiagnosis, missing equipment, spare parts.

This situation made it necessary to develop a method to meet the need of technicians and spare parts according to the nature of the fault by analyzing the sounds of the machine and making the fault determination.

The document U.S. Pat. No. 6,772,633 mentions a method for facilitating diagnosis of the operation of devices or machines based on acoustics. In this regard; it is ensured that obtaining a sound while a device is operating, processing the sound, acquiring one or more acoustics-based fault-signatures associated with the device, the fault-signatures being stored in a database, analyzing the processed sound based upon the one or more acquired fault-signatures and based upon such analysis, determining whether the device has a fault condition evidenced by the sound that it emitted. Therefore, there is no solution for receiving the sounds of the machines online or offline through a mobile application on the mobile devices of operators or customers, and analyzing the said sounds with artificial intelligence algorithms and reporting the fault information to the operator or customer through the mobile application. There is also no method for the direct detection of the defective part.

The document CN102809493A mentions a method an abnormal sound diagnosis device. A device has been developed to identify abnormal sounds in machines. Fault noise can be detected by time-frequency analysis of machine sound vibrations coming from a data acquisition unit. However, there is no solution to meet the need for technicians and spare parts according to the nature of the fault by analyzing the sounds of the machine by means of the application running online or offline only in a mobile device.

The document U.S. Pat. No. 9,824,511 mentions methods and systems for diagnosing vehicle systems using vehicle sounds, vibrations, or both. A system comprises one or more sensors and a processor. The sensors measure sound and vibrations from the vehicle. The processor identifies the vehicle system or device based on the measured sound and vibration. Therefore, there is no solution for receiving the sounds of the machines online or offline through a mobile application on the mobile devices of operators or customers, and analyzing the said sounds with artificial intelligence algorithms and reporting the fault information to the operator or customer through the mobile application. In addition, no estimating of malfunction is mentioned.

Consequently, the need to listen to the sounds of the machines online or offline through a mobile application on the mobile devices of operators or customers, and to analyze the said sounds using the fault classification algorithms, and to inform the operator or customer through the mobile application required the emergence of the solution according to the present invention.

OBJECTIVES AND SHORT DESCRIPTION OF THE INVENTION

The aim of the present invention is to provide a solution to meet the need for technicians and spare parts according to the nature of the fault, by analyzing the machine noises and performing estimation of malfunction.

Another aim of the invention is to provide a solution for playing the sounds of the machines online or offline through a mobile application on the mobile devices and analyzing the said sounds with the fault classification algorithms and reporting the fault information to the relevant people through the mobile application or an internet platform.

Another aim of the invention is assignment of qualified personnel to repair operations by means of fast and practical detection of defective parts of machines on an online or offline platform.

One another aim of the invention is to prevent the prolonged estimating of malfunction process due to missing equipment and spare parts incompatibility by means of fast and practical detection of defective parts of machines on an online or offline platform.

The other aim of the invention to provide a method that enables the reduction of logistics and personnel expenses by means of the determination of the personnel and spare parts requirements according to the nature of the fault by means of the estimating of malfunction realized online or offline.

In order to achieve the above aims, the present invention is a malfunction estimation system by analyzing machine sounds, and it comprises at least one mobile device which comprises a mobile application that allows the identification of malfunction sounds and sending them to the audio database, at least one data processing device which includes an internet platform that allows sharing of fault information with the relevant units, an ERP system that allows the storage and processing of various data, a data warehouse that allows data exchange between different environments, an audio database that stores data about fault sounds, a server that allows noise analysis of fault sounds, a learning component and estimation component for mentioned server, an offline estimation component for a mobile device that allows offline malfunction estimation.

The invention is a method that enables the analysis of machine noises to detect faults and comprises the following process steps:

recording the sound of the machine, which is considered to be a malfunction, for a certain period of time via online or offline application on the mobile device and sending it to sound database, sending the audio data recorded in the sound database to the server via a data warehouse, to determine the component of the malfunction by performing noise analysis of the data from the audio database on the server, following the determination of which component the fault is in, recording the fault detection information from the server via the data warehouse by sending it to the ERP system via the data warehouse, sending the diagnostic information recorded in the ERP system to the mobile device and data processing device of the relevant person through the data warehouse At the method of the invention also comprises continuous improvement of the failure estimation results performed by using the sound data converted into numerical values, by the mentioned server exchanging data together with the audio database via the data warehouse and instant data exchange.

DESCRIPTION OF THE FIGURES

In FIG. 1, system components of the method subject to the invention and interaction between them are shown.

REFERENCE NUMBERS

10. Mobile Device
20. ERP System
21. Data warehouse
30. Audio Database
40. Server
41. Learning Component
42. Estimation Component
43. Offline Estimation Component
50. Data processing device

DETAILED DESCRIPTION OF THE INVENTION

The invention relates to a method that allows the need for personnel and spare parts to be met according to the nature of the fault by means of noise analysis by machine noise analysis.

Machine sounds are recorded online or offline via a mobile application and a platform that works on data processing devices (50), such as machine operators, technicians or customers' mobile devices (10). Mentioned online sounds and audio data from an audio database (30) are analyzed on the server (40) with artificial intelligence algorithms and the fault information is reported to the mobile devices (10) or data processing device (50) of the mentioned personnel or customers through the mobile application or internet platform.

Offline sounds can be evaluated by the algorithm written on the mobile application for mobile devices (10). An offline estimation component (43) for the mobile device is used while estimation of malfunction. The audio data received in the offline estimation component (43) are processed instantly. The mentioned offline estimation component (43) does not have a self-learning ability. The offline estimation component (43) is updated periodically in the form of a week or a month by using the data generated at the learning component (41). It is ensured that the defective part is detected instantly with only one mobile device (10) without the need for additional equipment by means of mentioned method. In this regard, a fast and practical method is presented.

System components in which the present innovative method is applied and interaction between them are shown in FIG. 1. The mentioned system mainly has a mobile device (10) containing a mobile application that enables the identification of malfunction sounds and sending them to the audio database and a data processing device (50) that includes an internet platform, an ERP system (20) that keeps various data, a data warehouse (21) that allows data exchange between different environments, an audio database (30) that stores data associated with fault sounds, a server (40) that enables the analysis of noise related to fault sounds, learning component (41) and estimation component (42) associated with the said server (40), an offline estimation component (43) associated with the mobile device (10) that allows offline failure estimation.

In the present invention, the sound of the machine, which is considered to be a malfunction, is recorded for a certain period of time via an online or offline application on the mobile device (10) and sent to the audio database (30). The audio data recorded in the audio database (30) is sent to the server (40) via a data warehouse (21). The server (40) constantly interacts with the audio database (30) and exchanges data via the data warehouse (21). The data accumulated in the audio database (30) is continuously improved with the diagnostic analysis that processes in the server (40).

Data is processed daily within the learning component (41) of the server (40), and data is processed instantly within the estimation component (42). Otherwise, by means of a data flow from the learning component (41) to the estimation component (42) at certain times, continuous improvement is made in the estimating of malfunction system. Hereby, noise analysis of the audio data obtained from the audio database (30) is provided. Artificial neural network algorithms are used in the analysis processes performed on the server (40). Variant subtraction techniques are used in noise analysis. By using methods such as Spectrum, Audio Spectrum, Audio Spectrum Envelope and MFCC, sound data are taken and numerical values are converted into numerical values. By means of sound filtering methods, it is ensured that machine sounds are purified from external sounds.

After determining which component the fault is in, the fault detection information received from the server (40) via data warehouse (21) is sent to the ERP system (20) and recorded. The diagnostic information recorded in the ERP system (20) is sent to the mobile device (10) of the customer or technical personnel via the data warehouse (21) and to the data processing device (50) in which an internet platform is running. Thus, users can quickly and practically learn what component the malfunction is in.

The present invention, unlike all other methods, enables the detection of the defective part quickly without the need for additional equipment when a problem occurs with the machines. Practical estimating of malfunction via a mobile device (10) only installed on the application provides time and economic gain. When the right personnel are sent to the right job, the time spent by the works is pending is minimized by reducing the planning errors. With the determination of the fault, depending on the nature of the fault, the need for technical personnel and spare parts is determined, and logistics and personnel expenses are reduced.

The invention claimed is:

1. A machine malfunction detection and reporting system comprising:
   at least one mobile device having a mobile application, the mobile application adapted to identify malfunction sounds of the machine;
   an audio database receiving the identified malfunction sound from the mobile application of said at least one mobile device, said audio database storing the identified malfunction sound;
   at least one data processing device cooperative with said audio database and having an internet platform that is adapted to share the identified malfunction sound;
   a server cooperative with said at least one mobile device and said at least one data processing device, said server adapted to analyze noise from the malfunction sound;
   a filter cooperative with said server so as to remove the noise from the malfunction sounds prior to passing to said audio database and to said at least one mobile device; and
   an estimation component for said at least one mobile device that allows offline estimation of the malfunction sound for a particular malfunction.

2. A method for estimating a malfunction of a machine by analyzing a sound of the machine, the method comprising:
   recording the sound of the machine for a period of time via an online or offline application of a mobile device;
   sending the recorded sound to an audio database;
   sending audio data relating to the recorded sound in the audio database to a server via a data warehouse;
   analyzing the audio data from the server, the step of determining comprising filtering noise external of the machine from the audio data from the server;
   recording fault detection information from the server through the data warehouse by sending the fault detection information to an ERP system; and
   sending diagnostic information recorded in the ERP system to the mobile device, the diagnostic information pertaining to the fault detection information.

3. The method of claim 2, further comprising:
   converting sound data of the fault detection information into numerical values for the detection of the malfunction of the machine based on the numerical values of the sound data.

* * * * *